United States Patent [19]

Buettner et al.

[11] Patent Number: 5,792,349
[45] Date of Patent: Aug. 11, 1998

[54] DRUM FILTER FOR SEPARATING SOLIDS/LIQUID MIXTURES

[75] Inventors: Rolf Buettner; Rainer Bonn, both of Cologne, Germany

[73] Assignee: Kloeckner-Humboldt-Deutz AG, Cologne, Germany

[21] Appl. No.: 762,042

[22] Filed: Dec. 9, 1996

[30] Foreign Application Priority Data

Dec. 9, 1995 [DE] Germany ............ 195 46 038.3

[51] Int. Cl.[6] ............................................. B01D 33/067
[52] U.S. Cl. ..................... 210/232; 210/359; 210/402; 210/404; 210/499; 29/896.62; 162/272; 162/274
[58] Field of Search ........................... 210/359, 402, 210/232, 404, 499; 162/272, 274; 29/896.62

[56] References Cited

U.S. PATENT DOCUMENTS 3,947,361  3/1976  Jackson ........................ 210/402
4,346,008  8/1982  Leighton et al. ............... 210/404
4,663,040  5/1987  Elizondo et al. ............... 210/402
4,954,268  9/1990  Just et al. ..................... 210/402
5,326,471  7/1994  Pietzsch ....................... 210/402

OTHER PUBLICATIONS

KHG Humboldt Wedag brochure 5–243 d entitled "Hochleistungsfilter . . . des ist moderne Filtertechnik!" (6 pages) (no date).

Primary Examiner—W. L. Walker
Attorney, Agent, or Firm—Hill & Simpson

[57] ABSTRACT

In order to create a rotating drum filter with a filter medium that is extremely fine-meshed and nonetheless has a long service life, whereby the filter medium need not be completely replaced given localized damage thereto, it is inventively proposed that the filter medium be formed of a composite element body with at least two metallic layers, namely with an extremely finely porous, outer metal layer or, respectively, stainless steel fabric that is firmly applied onto at least one metallic supporting grid layer or, respectively, onto a stainless steel fabric layer that is coarse-meshed compared thereto.

21 Claims, 3 Drawing Sheets

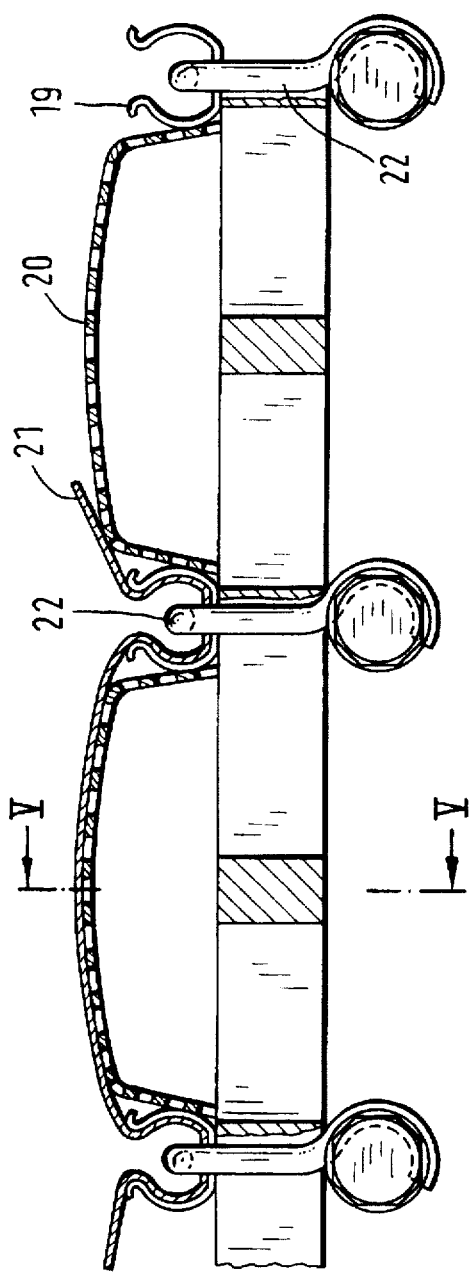
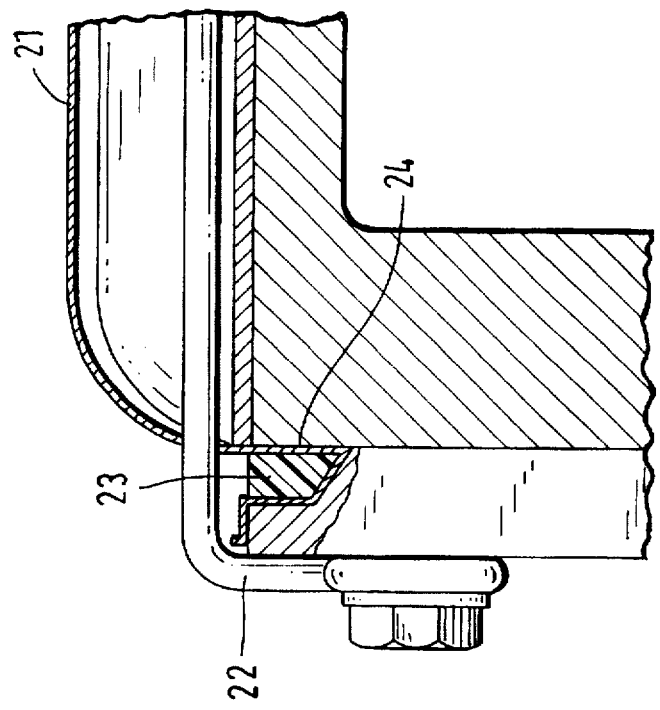

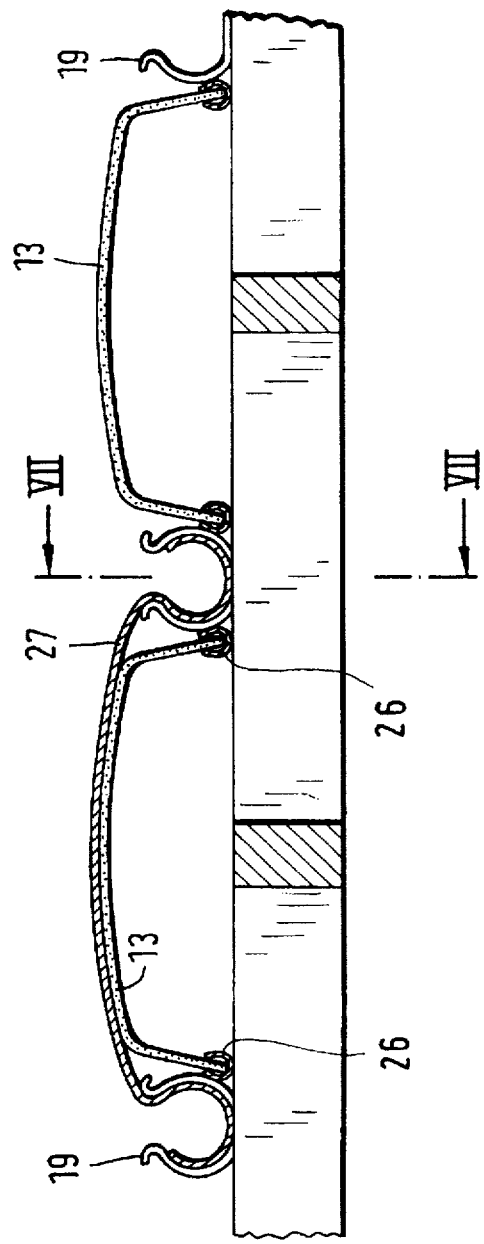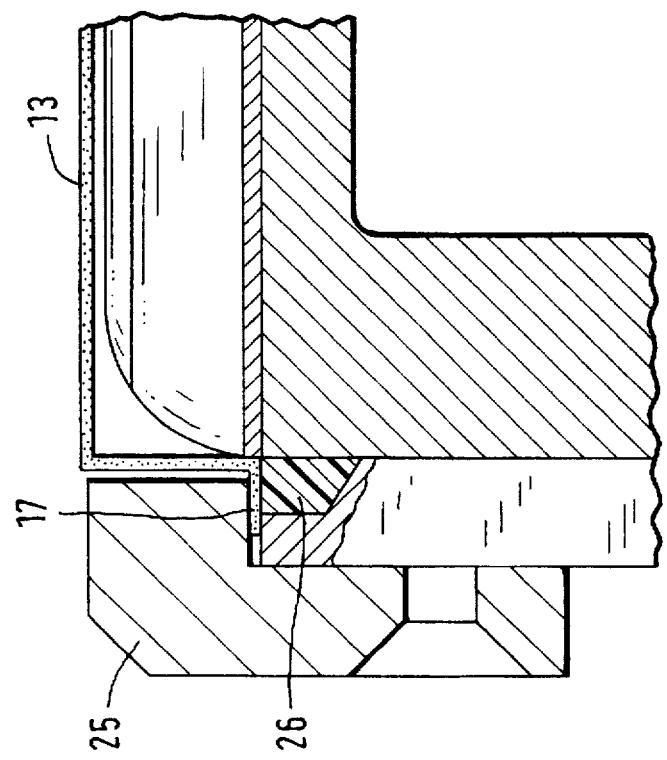

DRUM FILTER FOR SEPARATING SOLIDS/LIQUID MIXTURES

BACKGROUND OF THE INVENTION

The invention is directed to an internally cell-free drum filter for separating solids/liquid mixtures, comprising a drum filtering surface with a filter medium that is divided into sectors.

In a known, continuously operating, internally cell-free drum filter for separating solids/liquid mixtures (for example, as shown in the brochure 5-243 d "Hochleistungsfilter" of KHD Humboldt Wedag AG which is incorporated herein by reference), the filtering surface, namely the drum surface, is divided into sectors that lie parallel to the drum axis, each sector respectively having a perforated plate that extends over the length of the drum and forms or, respectively, limits a mini-cell, and a textile filter cloth is firmly stretched over all perforated plates, i.e. over the entire drum circumference. The filter cloth is axially fixed on the drum surface by rods that extend over the entire drum length which are inserted between the neighboring perforated plates fashioned as sieve bridges. These rods firmly clamp the filter cloth onto the drum surface after they have been fastened at their end sides. The radial fixing and sealing of the filter cloth at the drum ends ensues by clamping the filter cloth in an all around, channel with packing material. Due to a driving force for the separating process, namely due to a vacuum in the filter drum or, on the other hand, an overpressure in a housing that tightly surrounds the drum, a filter cake is formed on the turning filtering surface that immerses into a suspension bath. This filter cake is removed from the filter cloth with compressed gas at a location on the circumference of the drum.

As a result of the known structural embodiment of this type of drum filter, only textile filter weaves, single ply or multi-ply, could hitherto be employed.

The service life of the stressed filter weave can be negatively affected by the constant alternating stress of suction/blowing given the drum rotating at 10 to 30 revolutions per minute.

It is self-evident that mending rarely comes into consideration given local damage to the filter cloth at one location, but rather the entire filter cloth must usually be replaced, this resulting in relatively long interruptions in the operation of the rotating drum filter.

It has likewise already been proposed in filter technology for separating solids/liquid mixtures to employ a filter medium that is composed of a fabric of synthetic fibers or of metal wires as well. Due to their poor shapeability, however, metallic filter fabrics cannot be applied tightly enough to drum filter types of the types described above.

SUMMARY OF THE INVENTION

The invention is based on the object of creating a drum filter of the type described above with a filter medium that is extremely fine-meshed but nonetheless has a long service life, whereby the filter medium need not be completely replaced given local damage thereto.

It is characteristic of the inventive rotating filter that the filter medium thereof is composed of composite filter element bodies with at least two metallic layers, namely with an extremely finely porous outer metallic layer that is firmly applied to at least one metallic supporting grid layer. The outer layer of the composite filter element body is inventively composed of an extremely fine-mesh stainless steel fabric woven of fine metal threads or, respectively, wires and the supporting grid layer is composed of a stainless steel fabric having a coarse mesh compared thereto. In order to inventively unite these at least two layers to form the composite element body, the fine-meshed stainless steel fabric is sintered, welded, soldered or glued onto the coarse-meshed stainless steel fabric, namely such that the mesh openings or, respectively, pore openings of the filter medium remain open for the passage of the filtrate in the solids/liquid separating. The mesh width or, respectively, porosity of the outer layer of the composite filter element body can be provided in a range from, for example, 5 μm through, for example 500 μm dependent on the demands made on the separating power of the rotating filter, i.e. matched to the suspension to be separated and to the desired separating power. For protecting the fine-mesh metal layer, an additional steel fabric with coarser meshes can be firmly applied to the outside thereof.

According to a further feature of the invention, dimensionally stable composite cap members are formed from the at least two perforated metal layers, these cap members, as respective filter elements, covering the mini filter cells lying parallel to the axis of the rotating drum filter at the outside or replacing the perforated cell plates, given adequate rigidity thereof. The metallic, dimensionally stable composite filter element cap members are thereby releasably connected to the rotating filter drum, so that only the appertaining, individual composite filter element member, potentially with its underlying perforated plate when present, need merely be quickly replaced given localized damage to the filter medium.

BRIEF DESCRIPTION OF THE DRAWINGS

The invention and the further features and advantages thereof are explained in greater detail with reference to the exemplary embodiment schematically shown in the FIGS.

FIG. 4 is a cross sectional view illustrating the alternative possibility of fastening both composite filter element cap member as well as, alternatively thereto, a textile filter fabric to the filter drum with one and the same fastening technology.

FIG. 5 is a side sectional view taken generally along the line V—V of FIG. 4.

FIG. 6 is a cross sectional view illustrating an alternate embodiment of fastening and sealing the composite filter element cap member at the filter drum.

FIG. 7 is a side sectional view taken generally along the line VII—VII of FIG. 6.

DETAILED DESCRIPTION OF THE PREFERRED EMBODIMENTS

Figure 1:
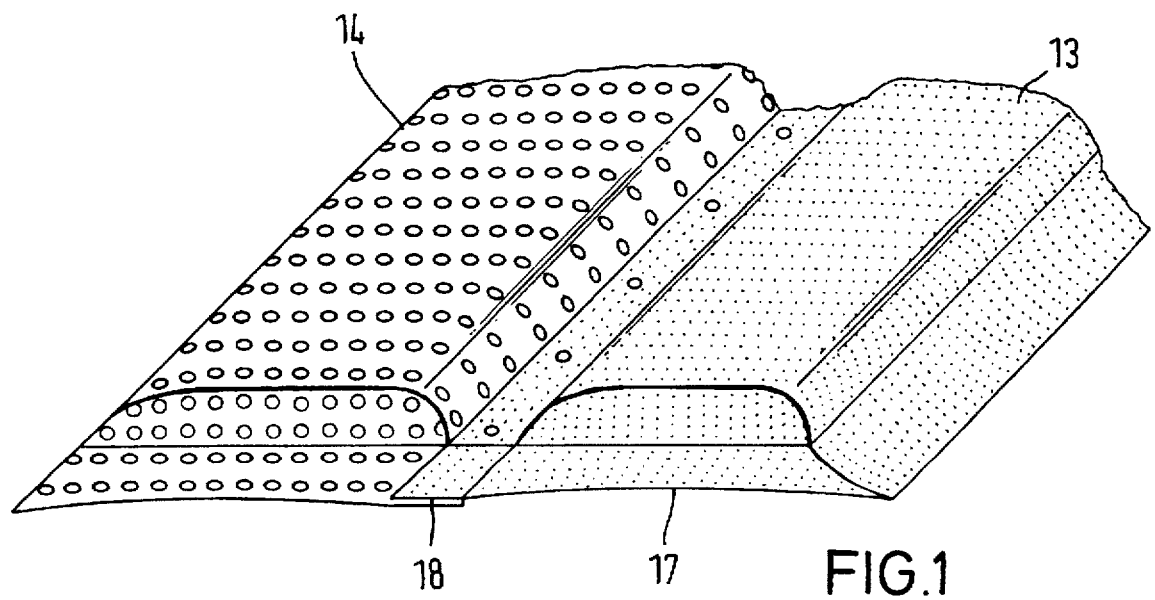
FIG. 1 is a perspective view of two perforated cell plates lying side-by-side, whereof the right plate is covered by a formed member shaped cap-like of a composite element of two metallic fabric layers as filter element for the rotating drum filter.
Figure 2:
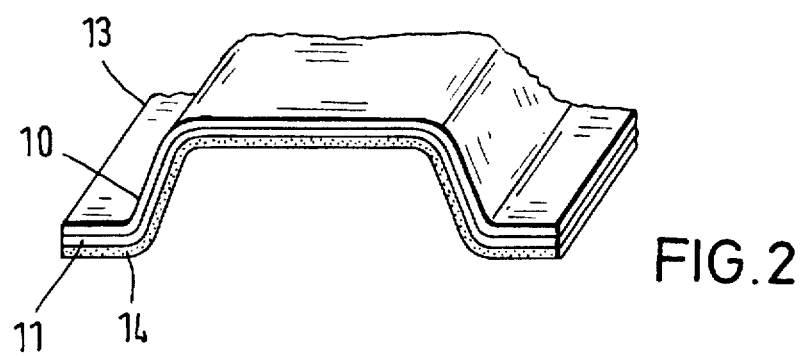
FIG. 2 is a cross sectional view through the two-layer composite filter element camp member of FIG. 1, applied onto the respective perforated cell plate of the rotating drum filter.

According to the sectional view of FIG. 2, an extremely fine-meshed stainless steel fabric 10, as a filter fabric, is firmly applied, for example sintered, onto a stainless steel fabric 11 or, respectively, a supporting fabric that is coarse-meshed compared to the fabric 10, so that the layers 10 and 11 yield a composite element. As a result of this joining technique, the inherently unstable filter fabric 10 is rendered stiff. A dimensionally stable composite filter element cap member 13 is thus formed from these elements 10, 11. The right-hand composite cap member 13 is thus seen in FIG. 1 as having a length which extends over the entire axial length of the filter drum. In cross section and in format, the composite filter medium element fashioned as a shaped member 13 is matched to the cross section and to the format of the respective perforated cell plate 14 extending over the entire drum axial length, and as a respective filter element, it covers the mini filter cells lying parallel to the drum axis of the rotating filter or, respectively, the perforated cell plates 14 thereof at the outside. The left-hand perforated cell plate 14 is shown in FIG. 1 as not yet covered by a composite filter element cap member.

Over and above this, the perforated cell plate 14 of the drum filter can be respectively entirely eliminated when the composite filter element cap member 13 comprises the required dimensional stability and rigidity, potentially by increasing the number of layers thereof.

Figure 3:
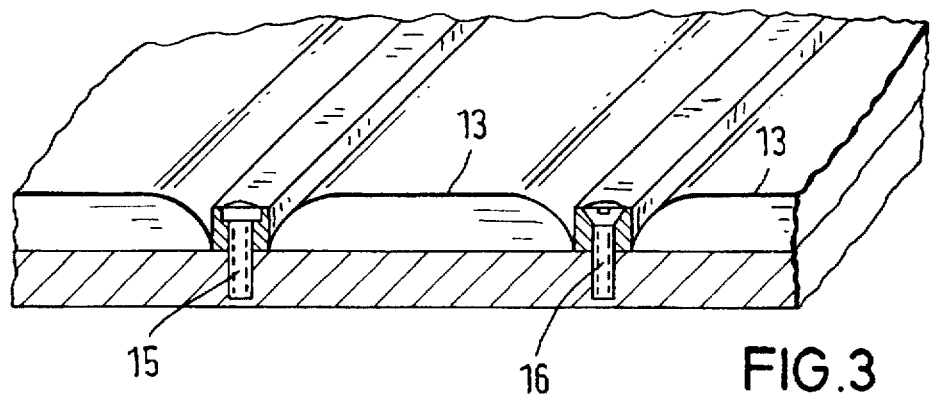
FIG. 3 is a partial perspective and schematic view of fastenings for composite filter element cap members lying adjacent to one another.

As FIGS. 1 and 3 particularly show, neighboring, metallic, dimensionally stable composite filter element bodies 13 are releasably attached with a respective longitudinal and axially extending flange 18 to the rotating filter drum, for example with screws 15, 16. The flange edges of neighboring composite bodies 13 can thereby lie above one another in overlapping fashioned in the region of the fastening screws. Given localized damage to the filter medium, only the corresponding composite filter medium body 13 need be replaced by a new one.

Alternatively to the application of the composite filter element body 13 by the exemplary screwing onto the filter drum according to FIG. 3, it is also possible to fashion the fastening technology for the composite filter element body 13 such that textile filter fabrics can also be secured.

FIGS. 4 and 5 illustrate the system of applying textile filter fabrics.

Perforated plate cells 20 are clamped between retainer profiles 19 that proceed axially relative to the drum axis and are firmly connected to the drum. The textile filter fabric 21 is guided into the retainer profile 19 with a tool and secured with a bar 22 lying axially with the drum. The axial seal of the fabric 21 ensues as a result thereof. The lateral sealing and fastening of the fabric 21 ensues by caulking with an all around packing cord 23 in the drum channel 24.

According to FIG. 5, the longitudinal flange 18 (FIG. 1) of a composite filter element body is eliminated given employment thereof and a replacement with the perforated plate cell 20 ensues. According to FIG. 6, the fastening of the filter element 13 at the drum sides ensues with clamp members 25 attached at the end faces that respectively fix the side flange 17 (FIGS. 1 and 7) of the filter element 13. Specifically, flexible all around seal profiles 26 can be utilized for sealing the filter element, and clips 27 of elastic and resilient material can be clamped over the filter element 13 in order to prevent sag of the filter elements 13, these clips 27 can be introduced into the two limiting retainer profiles 19 in engaged fashion, as FIGS. 6 and 7 show.

The inventive rotating filter can be equipped with an extremely fine-meshed filter medium without the latter be susceptible to damage. Quite to the contrary, a high service life of the filter medium is achieved by the inventive fashioning of the filter medium as an at least two-layer composite element.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

We claim as our invention:

1. A drum filter for separating solids/liquid mixtures comprising a drum filtering surface with a filter medium divided into a plurality of separate filter element bodies, each separate filter body comprising at least two metallic layers, a first layer being an extremely fine-pore outer metal layer, a second layer being a metallic supporting grid layer and said first layer being firmly applied to said second layer, each of said separate filter element bodies form a cap member that covers a filter cell, each cap member being detachably connected to the drum so that they are individually replaceable, the outer metal layer of the composite filter element body being composed of an extremely fine-meshed stainless steel fabric and the supporting grid layer being composed of a stainless steel fabric with coarse meshes compared thereto, and a coarser-mesh stainless steel fabric being applied to an outside of the outer, fine-meshed layer for the protection thereof, whereby all layers being firmly joined to one another by sintering.

2. A drum filter according to claim 1, wherein said cap members are dimensionally stable and said two metal layers are joined to one another, said cap members serving as a filter element and forming a covering for a mini filter cell which lies parallel to a rotating filter drum axis.

3. A drum filter according to claim 1, wherein said cap members are detachably connected to said rotating filter drum by one or more of screwing, tack welding, clamping and armoring and are individually replaceable.

4. A drum filter according to claim 3, wherein said composite cap members comprise at least two opposite flanges for their connecting to said filter drum.

5. A drum filter according to claim 3, wherein clips of elastic and resilient material that are spaced from one another are stretched over the composite filter element cap members.

6. A drum filter according to claim 1, wherein the metal fabric layers are joined together by at least one of sintering, welding, soldering or gluing.

7. A drum filter according to claim 1, wherein said cap members are dimensionally stable and said two metal layers joined to one another, said cap members serving as a filter element and covering a perforated plate of a mini filter cell which lies parallel to a rotating filter drum axis.

8. A filter medium for a drum filter having a plurality of filter cells, the filter medium for separating solids/liquid mixtures and comprising a plurality of separate filter element bodies with at least two metallic layers, a first layer being an extremely fine-pore metal layer, a second layer being a metallic supporting grid layer rand said first layer being firmly joined to said second layer, each separate filter element body forming a stable cap member for covering a filter cell, each cap member comprising a flange disposed along at least two opposite sides thereof, the flanges providing a means for detachably attaching each cap member to the filter drum so that each cap member is individually replaceable.

9. A filter medium according to claim 8, wherein said first layer is composed of an extremely fine-meshed stainless steel fabric and said second layer is composed of a stainless steel fabric with a comparatively coarse mesh.

10. A filter medium according to claim 9, wherein a third layer composed of a coarser-mesh stainless steel fabric is applied to said first layer on a side opposite said second layer, whereby all layers are firmly joined to one another by sintering.

11. A filter medium according to claim 8, wherein said layers are joined together by at least one of sintering, welding, soldering and gluing.

12. A filter medium according to claim 8, wherein said a dimensionally stable cap member is formed of the two joined layers.

13. A drum filter formed of mini filter cells rotatable about an axis for separating solids/liquid mixtures comprising a drum filtering surface with a filter medium divided into sectors, wherein said filter medium comprises filter element bodies with at least two metallic layers joined together to form dimensionally stable cap members for covering each of said mini filter cells, a first layer being an extremely fine-pore outer metal layer, a second layer being a metallic supporting grid layer and said first layer being firmly applied to said second layer, said metal layers being joined by at least one of sintering, welding, soldering and gluing, a third layer composed of a coarser-mesh stainless steel fabric being applied to said first layer on a side opposite said second layer.

14. A drum filter according to claim 13, wherein said cap members, as a filter element, cover a perforated plate of a mini filter cell which lies parallel to the rotating filter drum axis.

15. A drum filter according to claim 13, wherein said cap members are detachably connected to said rotating filter drum by one or more of screwing, tack welding, clamping, clamping and armoring and are individually replaceable.

16. A drum filter for separating solids/liquid mixtures comprising a drum filtering surface with a filter medium divided into sectors, wherein said filter medium comprises filter element bodies with at least two metallic layers, a first layer being an extremely fine-pore outer metal layer, a second layer being a metallic supporting grid layer and said first layer being firmly applied to said second layer, wherein dimensionally stable composite cap members are formed of said two metal layers joined to one another, said cap members, as a filter element, forming a covering for a mini filter cell which lies parallel to a rotating filter drum axis wherein said cap members are detachably connected to said rotating filter drum by one or more of screwing, tack welding, clamping and armoring and are individually replaceable wherein clips of elastic and resilient material that are spaced from one another are stretched over the composite filter element cap members.

17. A drum filter according to claim 16, wherein the outer layer of the composite filter element body is composed of an extremely fine-meshed stainless steel fabric and the supporting grid layer is composed of a stainless steel fabric with coarse meshes compared thereto.

18. A drum filter according to claim 17, wherein a coarser-mesh stainless steel fabric is applied to an outside of the outer, fine-meshed layer for the protection thereof, whereby all layers are firmly joined to one another by sintering.

19. A drum filter according to claim 16, wherein the metal fabric layers are joined together by at least one of sintering, welding, soldering or gluing.

20. A drum filter according to claim 16, wherein dimensionally stable composite cap members are formed of said two metal layers joined to one another, said cap members, as a filter element, covering a perforated plate of a mini filter cell which lies parallel to a rotating filter drum axis.

21. A drum filter according to claim 16, wherein said composite cap members comprise at least two opposite flanges for their connecting to said filter drum.

* * * * *